C. A. PARSONS, A. Q. CARNEGIE, M. BONE, AND S. S. COOK.
MANUFACTURE OF ARTICLES BY EXTRUSION.
APPLICATION FILED DEC. 7, 1921.

1,430,399.

Patented Sept. 26, 1922.
2 SHEETS—SHEET 1.

INVENTORS:
Charles A. Parsons,
Alfred Q. Carnegie
Matthew Bone
Stanley S. Cook
BY
Spear, Middleton, Donaldson & Hall ATTORNEY C. A. PARSONS, A. Q. CARNEGIE, M. BONE, AND S. S. COOK.
MANUFACTURE OF ARTICLES BY EXTRUSION.
APPLICATION FILED DEC. 7, 1921.

1,430,399.

Patented Sept. 26, 1922.
2 SHEETS—SHEET 2.

INVENTORS:
Charles A. Parsons,
Alfred Q. Carnegie,
BY Matthew Bone,
Stanley S. Cook.
Spear, Middleton, Donaldson & Hall ATTORNEY Patented Sept. 26, 1922.

1,430,399

UNITED STATES PATENT OFFICE.

CHARLES ALGERNON PARSONS, ALFRED QUINTIN CARNEGIE, AND MATTHEW BONE, OF NEWCASTLE-UPON-TYNE, AND STANLEY SMITH COOK, OF WALLSEND-UPON-TYNE, ENGLAND; SAID CARNEGIE, SAID BONE, AND SAID COOK ASSIGNORS TO SAID PARSONS.

MANUFACTURE OF ARTICLES BY EXTRUSION.

Original application filed July 7, 1919, Serial No. 309,207. Divided and this application filed December 7, 1921. Serial No. 520,623.

*To all whom it may concern:*

Be it known that we, CHARLES ALGERNON PARSONS, K. C. B., ALFRED QUINTIN CARNEGIE, and MATTHEW BONE, all subjects of the King of Great Britain and Ireland, and all residing at Heaton Works, Newcastle-upon-Tyne, in the county of Northumberland, England, and STANLEY SMITH COOK, a subject of the King of Great Britain and Ireland, and residing at Turbinia Works, Wallsend-upon-Tyne, in the county of Northumberland, England, have invented certain new and useful Improvements in the Manufacture of Articles by Extrusion, of which the following is a specification.

The present invention relates to the manufacture of articles having a stem and a base and particularly to the manufacture of turbine blading, and has for its object to cheapen the manufacture of such blading by the application of methods which occupy less time and are generally more expeditious than those at present employed.

In blading systems in which the portion of the blade contained within the circumferential groove in which the blading is secured is of the same section as the part which projects, the blades may be formed by cutting off lengths from a bar rolled to the requisite section, suitably formed packing pieces being interposed with the blades in the circumferential groove.

The present invention relates to a method in which the blades are formed integral with a base different in section from that of the blade, this base being in some cases extended to constitute the neighbouring packing piece, and in some cases so formed as to space the blades the required distance apart and in correct position.

In such a construction the cutting off of the blades from a rolled or drawn bar is not employed. The formation of the blade and its base by milling or other machining operations is both laborious and expensive.

It has been found possible according to this invention to substitute a process whereby the blade may be formed integral with its base or with a mass of metal from which the base may be machined.

The invention consists in the extrusion of the blade proper of a complete turbine blading element from a small billet through a die having an aperture in which the base is formed integral with the blade.

The invention also consists in the extrusion of a turbine blade and the formation of an integral base in the same operation by means of a quick-acting press or drop hammer.

The invention further consists in arresting the process of extrusion at such a point that the blade and base are formed of the desired length and shape.

The invention further consists in forming the base portion of the blade element substantially wider in every direction than the extruded blade portion for the purpose hereafter described.

Referring to the accompanying drawings which show a form of apparatus suitable for carrying the process into effect:—

Figure 1:
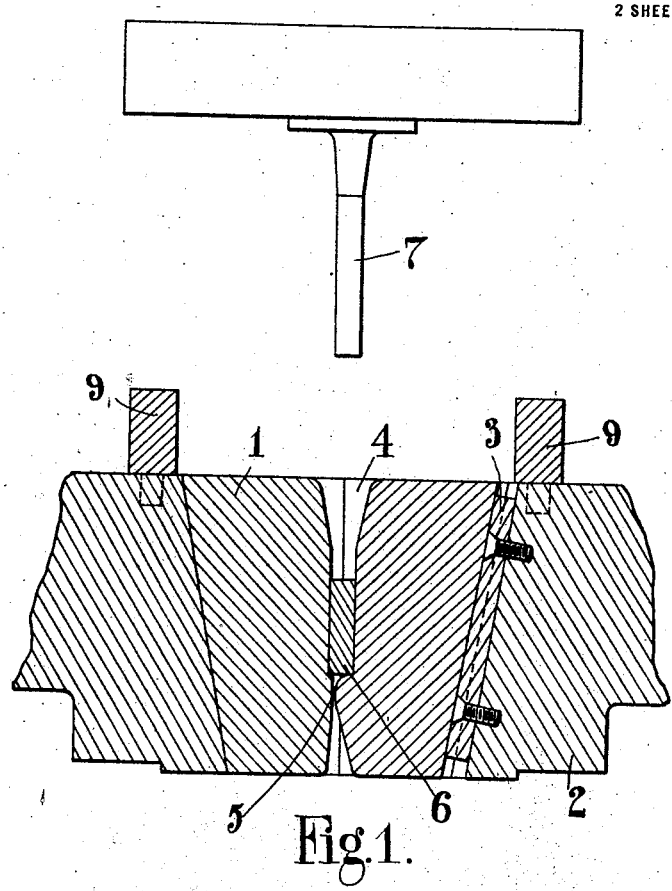
Figure 1 shows a sectional elevation of the die with the billet of metal placed therein.
Figure 2:
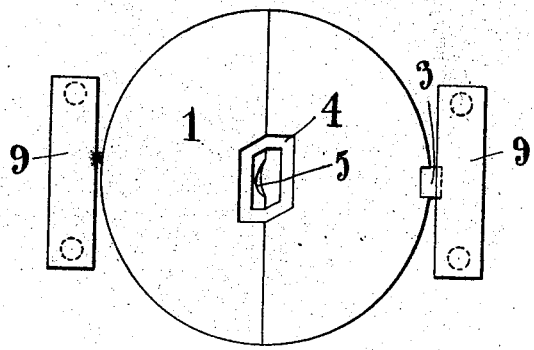
Figure 2 is a plan of the die.

In carrying the invention into effect according to one form the die 1, preferably divided into two or more portions, is placed within a suitable support 2 so as to register with one or more keys 3. An aperture 4 in the die is of a cross-section either the same as that of the base of the blade or such that the base can be readily machined from the mass of metal shaped in it. At the bottom of the aperture 4 an orifice 5 is cut, this orifice being of the shape of the blade proper. The mouth of the aperture 4 is preferably tapered, as indicated, in order to facilitate introduction of the billet of metal 6 which has the same general cross-section as that of the aperture 4 but is somewhat smaller.

While, however, we have shown the aperture 4 as parallel-sided over the greater part of its length, we do not confine the construction of the die to this form as in some cases it may be found advantageous to form the aperture with converging sides along the whole of its length. In cross-section also the aperture may be of any form found most suitable for the particular shape of base of the blade desired.

Figure 3:
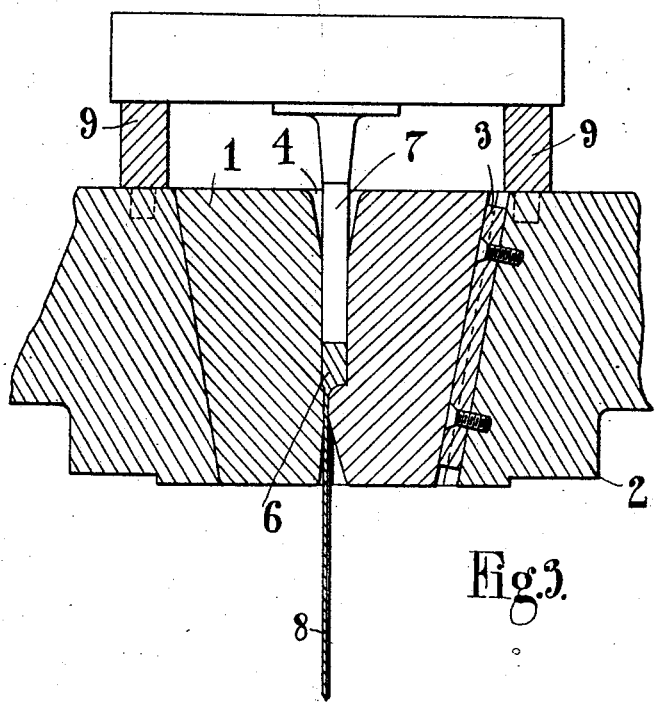
Figures 3 and 4 are sectional elevations of the die showing the blade after formation but before removal from the die.
Figure 4:
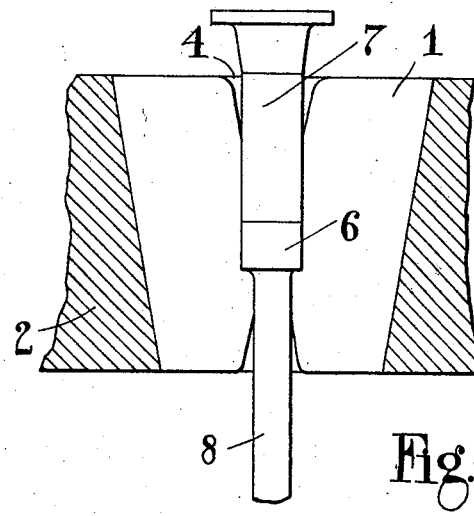

A drop hammer ram or similar tool 7 is arranged above the die so that in its descent it will press the billet of metal 6 to the shape of the aperture 4 at the same time extruding part of the metal through the orifice 5 to form the blade 8 as indicated in Figures 3 and 4.

A slight clearance is of course necessary in practice between the tool 7 and the aperture 4, but this has been omitted in the drawings for the sake of clearness.

Suitable stops 9 are fitted on the support 2 or in any other appropriate position to arrest the motion of the drop hammer 7 when the required amount of metal has been extruded.

While we have described a die in which pressure is applied opposite the extrusion orifice, we do not confine the invention to this construction as it might, for example be found advantageous in some cases to apply the pressure in a direction other than in line with the orifice, although obviously from the point of view of ease in carrying out the extrusion process the arrangement illustrated is the most advantageous.

The size of billet employed varies with the length of blade and size of base required; in any case, however, the billet is comparatively small and it is essential that the process be carried out quickly to avoid cooling the billet and extruded metal below the temperature at which it can be extruded. Therefore we prefer to employ a quick-acting press giving the necessary pressure but any other suitable means, such as a drop hammer or quick-acting hydraulic press may be used.

When employing a drop hammer the height of fall and weight of the hammer would be so regulated as to give the required pressure and velocity of extrusion.

We have found that in making blades according to this invention, in which a fine edge is required, it is advantageous to design the base portion so that its sides and particularly its corners do not coincide with the fine edges of the blade, to avoid excessive cooling of the metal in the neighborhood of these edges by the chilling action of the die and to give such a distribution of the metal in the neighbourhood of the edges as will promote its equable flow into the blade. We find, however, that if the base is made substantially wider in every direction than the blade, and if the whole operation is carried out with sufficient quickness, the metal of the billet remains sufficiently hot throughout to flow properly in all parts and permit of a fine edge being produced.

It has been found by experiment that there is a critical velocity of extrusion above which there is risk of seizure in the die. This velocity is dependent to some extent on the size and shape of the extruded piece, and whilst therefore a quick process is necessary to avoid too great cooling of the billet, during the operation the speed must be such that the velocity of extrusion does not exceed such critical value.

In cases where the blade edges are required to be thinner than can conveniently be formed according to the above method, we may shape the extrusion orifice so as to form a bulb or bead or other suitable local thickening on the fine edge of the blade. We generally prefer to form this bulb or thickening on the convex side of the blade so that it may be easily removed by subsequent grindings, machining or drawing, but we may in some cases form it on the concave side of the blade, or it may take the form of a bulb projecting both on the concave and convex sides.

It will be obvious that by replacing in the above manner several milling or other operations hitherto necessary, and all of a comparatively lengthy nature, by one rapid operation, much time and labour are saved and expenditure thereby reduced.

Having now described our invention, what we claim as new and desire to secure by Letters Patent is:—

1. A process of manufacturing finished metal articles having a stem and base, according to which a metal billet is introduced into a container and at a single operation part of said billet is extruded from the said container to form the stem and another part of said billet is drop-forged to form a base integral with said stem.

2. A process of manufacturing finished metal articles having a stem and base, according to which a metal billet is located in operative relation to an apertured die and said billet is struck a blow to force part thereof through said aperture to form the stem and another part thereof into said die to form a base integral with said stem.

3. A process of manufacturing turbine blading, according to which part only of a metal billet is extruded to form the blade and another part of said billet is formed into a base integral with said blade.

4. A process of manufacturing turbine blading, according to which at a single operation part only of a metal billet is extruded to form the blade and another part of said billet is forged into a base integral with said blade.

5. A process of manufacturing turbine blading, according to which a metal billet is located in operative relation to an apertured die and at a single operation part of said billet is extruded through said aperture to form the blade and another part of said billet is forced into said die to form a base integral with said blade.

6. A process of manufacturing turbine blading, according to which part of a metal billet is extruded to form the blade and another part of said billet is drop-forged to form a base integral with said blade.

7. A process of manufacturing turbine blading, according to which a metal billet is located in operative relation to an apertured die and said billet is struck a blow to force part thereof through said aperture to form the blade, and another part thereof into said die to form a base integral with said blade.

8. A process of manufacturing metal articles having a stem and a base, according to which a hot metal billet is introduced into a less hot container, thereby rendering certain exterior portions of said billet less hot than certain interior portions and at a single operation part of said hotter interior is extruded to form the stem and another part of said billet is drop-forged to form a base integral with said stem.

9. A process of manufacturing metal articles having a stem and a base, according to which a hot metal billet is located in operative relation to a less hot apertured die, thereby rendering certain exterior portions of said billet less hot than certain interior portions and said billet is struck a blow to force part of said hotter interior through said aperture to form the stem and another part of said billet into said die to form a base integral with said stem.

10. A process of manufacturing turbine blading, according to which a hot metal billet is introduced into a less hot container, thereby rendering certain exterior portions of said billet less hot than certain interior portions, part of said hotter interior is extruded to form a thin-edged blade and another part of said billet is forged to form a base integral with said blade proper.

11. A process of manufacturing turbine blading, according to which a hot metal billet is located in operative relation to an apertured die, thereby rendering certain exterior portions of said billet less hot than certain interior portions and said billet is struck a blow to force part of said hotter interior through said aperture to form a thin-edged blade and another part of said billet into said die to form a base integral with said stem.

In testimony whereof we have signed our names to this specification.

CHARLES ALGERNON PARSONS.
ALFRED QUINTIN CARNEGIE.
MATTHEW BONE.
STANLEY SMITH COOK.